United States Patent [19]
Key, Jr. et al.

[11] 3,949,604
[45] Apr. 13, 1976

[54] BICYCLE SPOKE TENSION GAUGE AND ADJUSTER

[76] Inventors: Columbus B. Key, Jr., 212 Orange St., SE., Apt. 2, Washington, D.C. 20032; Vincent M. Spaulding, 2914 W St., SE., Washington, D.C. 20020

[22] Filed: Feb. 18, 1975

[21] Appl. No.: 550,586

[52] U.S. Cl. ............................................. 73/144
[51] Int. Cl.² .......................................... G01L 5/06
[58] Field of Search ........ 73/144; 81/57.38, DIG. 5, 81/DIG. 7

[56] References Cited
UNITED STATES PATENTS

| | | | |
|---|---|---|---|
| 1,031,208 | 7/1912 | Thompson | 73/144 |
| 3,174,334 | 3/1965 | McKernan | 73/144 |
| 3,618,379 | 11/1971 | Lipton | 73/144 |

*Primary Examiner*—Jerry W. Myracle
*Attorney, Agent, or Firm*—Clarence A. O'Brien; Harvey B. Jacobson

[57] ABSTRACT

A bicycle wheel spoke tension gauge has a frame provided with a pair of spaced ends from which extend a pair of co-directional arms terminating in hooks engageable with a spoke whose tension is to be gauged. Between the arms is a slidable rod biased toward the spoke for cooperation with a fixed reference point and providing an indication of the tension of the spoke. Advantageously, a wrench in the form of a slotted disk is rotatably mounted on one of the arms for adjusting spoke tension while the gauge is mounted on the spoke.

9 Claims, 6 Drawing Figures

U.S. Patent   April 13, 1976   3,949,604
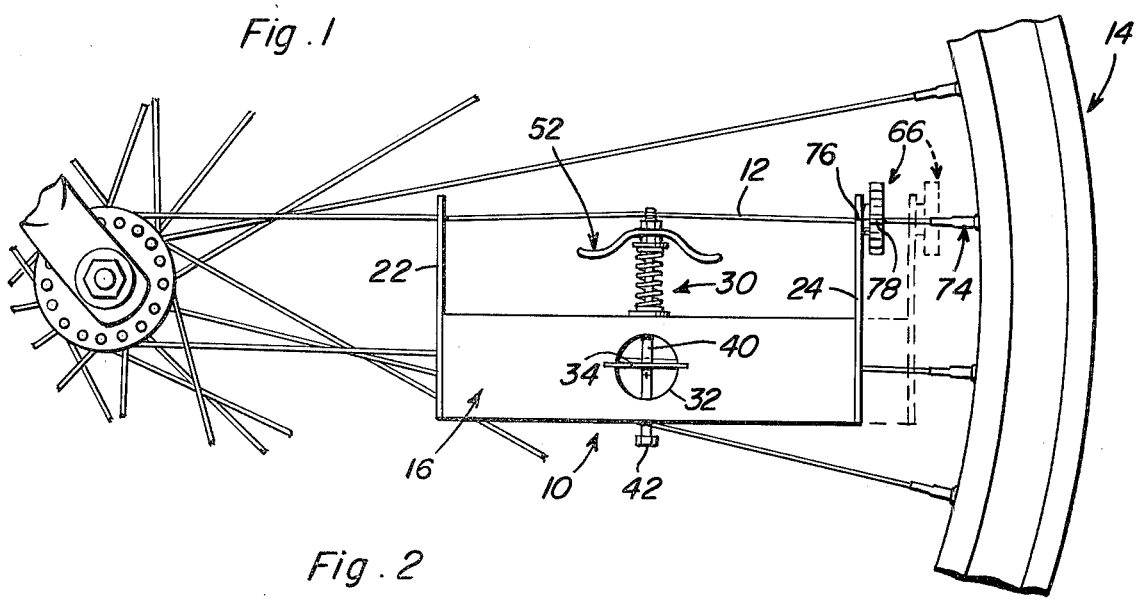
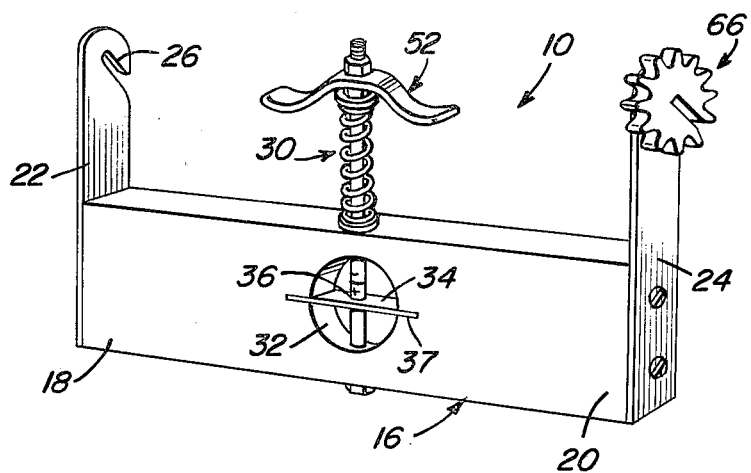
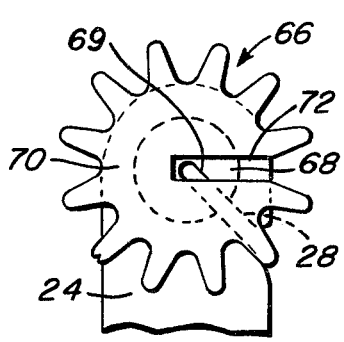
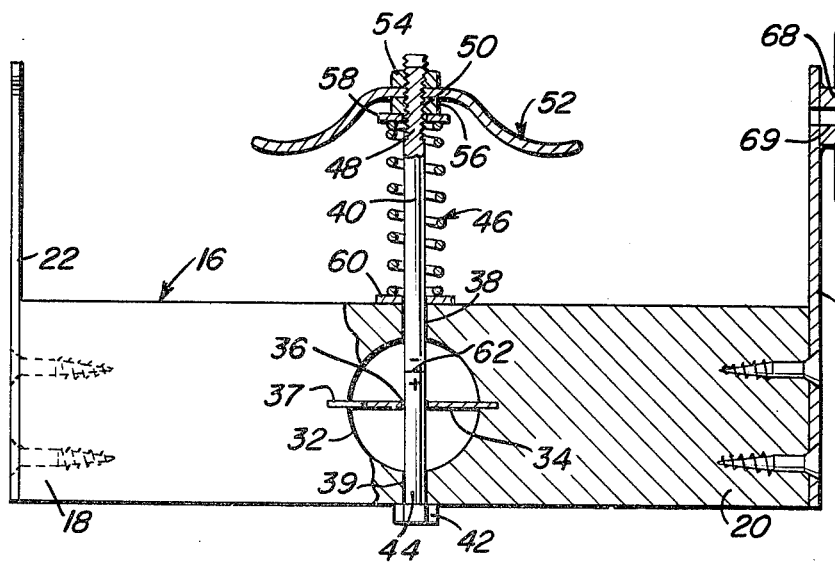
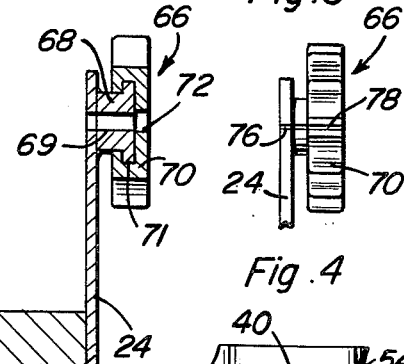
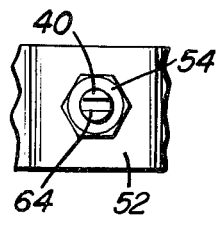

BICYCLE SPOKE TENSION GAUGE AND ADJUSTER

BACKGROUND OF THE INVENTION

1. Field of the Invention

This invention relates generally to a tension gauge, and particularly to a bicycle spoke tension gauge and adjuster.

2. Description of the Prior Art

Both the strength and position of the rim of a conventional bicycle wheel is determined by the tension on the spokes of the wheel relative to each other. The positioning of a bicycle wheel rim relative to the hub thereof is a job requiring great patience and much skill when done by traditional methods.

It is known generally to measure tension in a flexible element by applying a known lateral force on the flexible element between longitudinally spaced stationary points on the element. Examples of devices which have been proposed for gauging tension in such a manner are as follows:

| | | |
|---|---|---|
| 1,031,208 | A. W. Thompson | July 2, 1912 |
| 2,618,153 | J. G. McKernan | November 18, 1952 |
| 3,372,582 | J. Weiss et al | March 12, 1968 |
| 3,618,379 | A. A. Lipton | November 9, 1971 |

SUMMARY OF THE INVENTION

It is an object of the present invention to provide a gauge for checking the relative tension on bicycle spokes and similar stressed flexible elements.

It is another object of the present invention to provide a tool which assists in alignment of bicycle wheels, and the like.

It is yet another object of the present invention to provide a tool capable of both measuring the tension on a bicycle spoke and facilitating adjustment of the spoke being engaged.

These and other objects are achieved according to the present invention by providing a bicycle spoke tension gauge having: a frame provided with a pair of spaced ends; arms extending co-directionally from the ends of the frame and terminating in hooks engageable with a spoke whose tension is to be gauged; and an arrangement interposed between, and parallel to, the arms for providing a relative indication of the tension of the spoke being gauged.

Advantageously, the frame of the gauge further is provided with an opening disposed substantially midway between the spaced ends of the frame and arranged perpendicular to the extent of the arms. A plate is mounted in the opening so as to bisect same and is provided with an aperture for receiving a biased, slidably mounted rod cooperating with the plate to provide the relative indication of tension. The frame is preferably still further provided with a bore extending parallel to the extent of the arms and arranged passing through the opening in alignment with the aperture in the plate for receiving the rod. The latter is slidably arranged in the bore provided in the frame and in the aperture provided in the plate. A head on one end of the rod simultaneously restrains sliding movement of the rod in the bore and facilitates an upward pressing of the rod to a spoke being gauged to assure proper seating of the spoke into a slot provided in the rod.

A coiled compression spring is preferably disposed on the other end of the aforementioned rod for biasing the rod toward the spoke. Further, the position of a handle affixed to the other end of the rod and abutting the coiled spring, facilitates sliding movement of the rod against the bias of the spring and permits one-handed operation of the tool.

A particularly advantageous feature of the present invention mounts a wrench on one of the arms adjacent the hook thereof for permitting tightening or loosening of a spoke being gauged. This wrench advantageously includes a wheel rotatably mounted on the associated arm and provided with a radial slot arranged for engaging an adjusting nut of the spoke being gauged and adjusted. In this manner, it will be appreciated that a spoke of a bicycle wheel, and the like, may be both gauged for a desired tension and adjusted to the desired tension with a single application of the tool to the spoke in accordance to the present invention.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, partly schematic, side elevational view showing a bicycle wheel spoke tension gauge and the adjuster according to the present invention mounted on the spoke of a bicycle wheel.

FIG. 2 is a perspective view showing the present invention.

FIG. 3 is a side elevational view, partly cut away and in longitudinal section, showing the tool according to the present invention.

FIG. 4 is a fragmentary, top plan view showing a detail of the tool of FIGS. 2 and 3.

FIG. 5 is a fragmentary, side elevational view showing another detail of the tool of FIGS. 2 and 3.

FIG. 6 is a fragmentary, end elevational view showing still another detail of the tool of FIGS. 2 and 3, and looking from the right of the tool as same is viewed in FIGS. 2 and 3.

DESCRIPTION OF THE PREFERRED EMBODIMENTS

Referring now more particularly to FIGS. 1–4 of the drawings, a gauge 10 according to the present invention for measuring the tension on a conventional spoke 12 of the standard bicycle wheel 14, and the like, has a frame 16 provided with a pair of spaced ends 18 and 20. Arms 22 and 24 extend codirectionally from ends 18 and 20 and terminate in hooks 26 and 28 engageable with spoke 12. While conventional wood screws have been shown as attaching arms 22 and 24 to frame 16, it will be appreciated that any suitable manner of attachment may be employed as advantageous and desirable. An arrangement 30 is interposed between, and arranged generally parallel to, arms 22 and 24 for providing a relative indication of the tension on spoke 12.

Frame 16 has an opening 32 disposed substantially midway between ends 18, 20 and arranged perpendicular to the extent of arms 22, 24. Arrangement 30 includes a plate 34 mounted in opening 32 in such a manner as to effectively bisect the opening 32 and is provided with an aperture 36 for slidably receiving resilient arrangement 30. Plate 34 may be easily fitted into opening 32 by the provision of opposed slots 37 in the walls defining opening 32. By receiving the spaced ends of plate 34, the slots 37 will retain plate 34 within the opening 32. The frame is still further provided with bores 38, 39 extending parallel to the extent of arms 22, 24 and arranged passing through opening 32 in alignment with aperture 36 in plate 34 for receiving a rod 40 in a manner to be described below.

Arrangement 30 further includes a rod 40 slidably arranged in bores 38, 39 and in aperture 36. This rod 40, which may be in the form of the illustrated bolt, is advantageously provided with a head 42 on a one end 44 of rod 40 for restraining sliding movement of rod 40 within bores 38, 39 in the direction toward spoke 12. Further, it will be appreciated that head 42 also facilitates manual movement of rod 40 toward the spoke 12 to facilitate proper seating of spoke 12 into slot 64 of rod 40. A conventional coiled compression spring 46, and the like, is disposed on the other end 48 of rod 40, with end 48 extending away from frame 16 and being provided with conventional screw threads 50. A handle 52 is affixed to end 48 of rod 40 so as to function as a finger pull and as an abutment for one end of spring 46. As will be appreciated, handle 52 facilitates sliding movement of rod 40 against the bias of spring 46. One advantageous manner of affixing handle 52 to end 48 of rod 40 is by use of a pair of nuts 54 and 56 in the manner illustrated in, for example, FIG. 3 of the drawings, the nuts 54 and 56 permitting as well adjustment of the spring loaded rod 40 to a predetermined lateral force acting upon the spoke. Further, conventional washers 58 and 60 may be employed as seats for the ends of coiled spring 46.

A mark 62, advantageously in the form of a kerf formed in rod 40, can be provided on rod 40 for designating, relative to plate 34, a normal predetermined tension of a spoke 12 being gauged. Further, and most importantly, a slot 64 (FIG. 4) is provided in a terminal surface of end 48 of rod 40 for receiving spoke 12. In this manner, spoke 12 is received in slot 64 and retained thereby as spring 46 biases rod 40, and thus slot 64, toward spoke 12 while being retained relative to the spoke 12 by use of hooks 26, 28 and a relative measure of the tension of the spoke 12 may be ascertained.

Referring now more particularly to FIGS. 5 and 6 of the drawings, a wrench 66 is advantageously mounted on, for example, arm 24 adjacent the hook 28 thereof for tightening and loosening tension on a spoke 12 being gauged. This wrench 66 advantageously includes the illustrated hub 68 provided with a slot 69 designed for matching with the slot which forms the associated hook 28. A wheel 70 is mounted on hub 68 for rotation with respect to, and is retained on hub 68 by the flange 71. This wheel 70 is also provided with a slot 72 which mates with slot 69 and hook 28 so as to permit wrench 66 to slip over spoke 12. As will be readily appreciated, slot 72 can be made to engage the adjusting nut 74 (FIG. 1) associated with spoke 12 by sliding gauge 10 along the spoke 12 until wrench 66 assumes the position shown in broken lines in FIG. 1. Then, rotation of the wheel 70, which rotation is facilitated by the projections provided on the periphery of wheel 70, will cause nut 74 to be rotated and the tension on the spoke 12 to be varied in a known, conventional manner.

In order to facilitate mounting of gauge 10 with wrench 66, onto a spoke 12, it is advantageous to provide alignment indicator marks 76 and 78 on the upper portion of arm 24 and the periphery of wheel 70. Coordinating the rotation of mark 76 with mark 78 will, by proper placement of mark 76, 78, assure that the various slots 69 and 72 are in alignment with the associated hook-forming slot 28 of arm 24 in order to eliminate any possible difficulty in attempting to place gauge 10 on spoke 12. In addition, as perhaps best can be seen from FIG. 6 of the drawings, slot 72 advantageously has squared surfaces adjacent the axis of rotation of wheel 70 in order that wrench 66 may be used with a nut 74, or similar connector, that has a square configuration as well as other shapes. While some spoke connectors do have configurations other than square in cross section, most connectors for fastening spokes to the rim of a bicycle wheel are somewhat square in shape where the wrench 66 will engage same. Thus, by squaring the inward portion of slot 72, wheel 70 may be used with spokes having square connectors and connectors having shapes other than square.

As will be appreciated from the above description and from the drawings, a gauge 10 according to the present invention provides reliable and efficient manner of adjusting bicycle wheels. Further, the device is durable, inexpensive to construct, may be employed with or without wrench 66, is provided with head 42 which facilitates manipulation of rod 40 to insure proper seating of the spoke 12 within slot 64 of rod 40, and may be employed one-handed because of the provision of the suitably configured handle 52 which functions as a finger pull.

When assembled, the arrangement of components will allow the hooking of hooks 26 and 28 to the spoke 12 and the seating of spoke 12 into slot 64 provided in the spring loaded rod 40. The seating position of spring loaded rod 40 in relationship to the fixed indicator plate 34 will cause spoke 12 to deflect, resulting in the, for example, mark 62 provided on rod 40 to be either above or below the location of the plate 34, thus indicating the tension of spoke 12 in relation to a precalibrated setting. When mark 62 is in alignment with plate 34, the tension of spoke 12 is adequate. Consequently, by checking the spokes on a wheel 14 with the gauge 10, the tension of the spoke can be brought into an adequate desired tolerance by tightening or loosening the spoke at its connection with the rim. Wrench 66 will facilitate this adjustment as described above. The adjustment of spokes based on these readings will assist in the alignment of the bicycle wheel. Prior to the use of this invention, the spring loaded rod 40 is to be calibrated, or adjusted, to the tension of one spoke, such as spoke 12, which the user of the device determines is adequate in tension based on, for example, the well known technique of finger plucking a spoke in the wheel to be aligned.

For greater accuracy, the degrees of movement of rod 40 may be amplified by providing a magnifying lens (not shown), and the like, over the marking provided on rod 40. This may be accomplished in a simple manner as by terminating plate 34 short of the side surface of frame 16 and arranging a circular double-convex lens in opening 32. Further, toward the end of amplifying the readings of the relationship between the markings on rod 40 and plate 34, or in any event, opening 32 may be in the form of a recess (not shown) in place of the illustrated through opening. This form of opening 32 permits plate 34 to be eliminated and the markings, such as mark 62, to be made on walls of the recess. It will be appreciated that a conventional magnifying lens may be arranged at the opening of the recess as by the use of a sleeve (not shown), and the like, inserted into the recess.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents nay be resorted to, falling within the scope of the invention.

What is claimed as new is as follows:

1. A bicycle spoke tension gauge, comprising, in combination:

a frame having a pair of spaced ends;

arms extending co-directionally from the ends of the frame and terminating in hooks engageable with a spoke whose tension is to be gauged; and indicator means interposed between the arms for providing an indication of the tension on the spoke being gauged, and the frame further has an opening disposed substantially midway between the spaced ends of the frame and arranged perpendicular to the extent of the arms, the indicator means including a plate mounted in the opening for bisecting the opening and provided with an aperture, the frame still further provided with a bore extending parallel to the extent of the arms and arranged passing through the opening in alignment with the aperture in the plate, the resilient means further including a rod having a pair of longitudinally spaced ends and slidably arranged in the bore provided in the frame and in the aperture provided in the plate, the latter forming a fixed reference point for the rod, a head on a one end of the rod for restraining the rod in a one direction of movement within the bore, a coiled compression spring disposed on the other end of the rod, the other end extending from the frame, and a handle affixed to the other end of the rod at a point thereon spaced from the frame and arranged abutting an end of the coiled spring spaced from the frame for facilitating sliding movement of the rod against the bias of the spring.

2. A structure as defined in claim 1, wherein a mark is provided on the rod for designating normal tension of a spoke being measured and cooperating with the plate to indicate relative tension on the spoke, and a slot being provided in a terminal surface of the other end of the rod for receiving the spoke.

3. A structure as defined in claim 2, wherein a wrench is mounted on one of the arms adjacent the hook thereof for tightening and loosening tension on a spoke being gauged.

4. A structure as defined in claim 3, wherein the wrench includes a wheel rotatably mounted on the arm and provided with a radial slot arranged for engaging a connector associated with the spoke, the wheel functioning as an adjuster for manipulating the connector and varying tension on the spoke.

5. A bicycle spoke tension gauge, comprising, in combination:

a frame having a pair of spaced ends;

arms extending co-directionally from the ends of the frame and terminating in hooks engageable with a spoke whose tension is to be gauged; and indicator means interposed between the arms for providing an indication of the tension on the spoke being gauged, and a wrench is mounted on one of the arms adjacent the hook thereof for tightening and loosening tension on a spoke being gauged.

6. A structure as defined in claim 5, wherein the wrench includes a wheel rotatably mounted on the arm and provided with a radial slot arranged for engaging a connector associated with the spoke, the wheel functioning as an adjuster for manipulating the connector and varying tension on the spoke.

7. A bicycle spoke tension gauge, comprising, in combination:

a frame having a pair of spaced ends;

arms extending co-directionally from the ends of the frame and terminating in hooks engageable with a spoke whose tension is to be gauged;

indicator means interposed between the arms for providing an indication of the tension on the spoke being gauged, and the frame further has an opening disposed substantially midway between the spaced ends of the frame and arranged perpendicular to the extent of the arms, the indicator means including a plate mounted in the opening for bisecting the opening and provided with an aperture, rod means through said aperture and spring-biased into engagement with a spoke between the hooks on the arms, and a mark provided on the rod for designating normal tension of a spoke being measured and cooperating with the plate to indicate relative tension on the spoke.

8. A structure as defined in claim 7, wherein a wrench is mounted on one of the arms adjacent the hook thereof for tightening and loosening tension on a spoke being gauged.

9. A structure as defined in claim 8, wherein the wrench includes a wheel rotatably mounted on the arm and provided with a radial slot arranged for engaging a connector associated with a spoke, the wheel functioning as an adjuster for manipulating the connector and varying tension on the spoke.

* * * * *